US006263336B1

(12) United States Patent
Tanaka (10) Patent No.: US 6,263,336 B1
(45) Date of Patent: Jul. 17, 2001

(54) TEXT STRUCTURE ANALYSIS METHOD AND TEXT STRUCTURE ANALYSIS DEVICE

(75) Inventor: Toshio Tanaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/016,226

(22) Filed: Jan. 30, 1998

(30) Foreign Application Priority Data

Feb. 27, 1997 (JP) .................................... 9-044388

(51) Int. Cl.[7] .................................................. G06F 17/30
(52) U.S. Cl. .................................. 707/6; 707/3; 707/104
(58) Field of Search .................................. 707/6, 3, 104, 707/501, 513, 516, 521, 522, 523, 524, 531; 704/9, 3, 4, 10

(56) References Cited

U.S. PATENT DOCUMENTS

| | | | |
|---|---|---|---|
| 4,773,009 | * | 9/1988 | Kucera et al. ........................ 707/531 |
| 5,392,428 | * | 2/1995 | Robins ...................................... 707/3 |
| 5,642,520 | * | 6/1997 | Takeshita et al. ........................ 704/3 |
| 5,774,833 | * | 6/1998 | Newman ................................... 704/9 |
| 5,864,789 | * | 1/1999 | Lieberman et al. ...................... 704/9 |

OTHER PUBLICATIONS

Lin et al., Logical structure analysis of book document images using contents information, Proceedings: 4th intl. conference on document analysis and recognition, vol. 2, pp. 1048–1054, Aug. 20, 1997.*

Interactively Restructuring HTML Documents, Fifth International World Wide Web Conference, May 6–10, 1996, Paris, France.

Digestor: Device–Independent Access to the World Wide Web, Proceedings for the Sixth International World Wide Web Conference, Apr., 1997, p. 655–663.

* cited by examiner

Primary Examiner—Kim Vu
Assistant Examiner—Sanjiv Shah
(74) Attorney, Agent, or Firm—Oliff & Berridge, PLC (57) ABSTRACT

A text structure analysis method and apparatus in which the apparatus includes a content boundary pattern storage device for storing content boundary patterns indicating boundaries of various contents represented as collections of given contents of text and a text analysis device for detecting boundary sections present in the input text based on the contents stored in the content boundary pattern storage device. The text analysis device establishes content boundaries for those detected boundary sections. When extracted from the input text as contents for each collection of contents of that text, the content boundary patterns indicating the boundaries of the various contents are detected, content boundaries are established for that input text, and the text is treated in units of content for each collection of content based on the established content boundaries.

21 Claims, 9 Drawing Sheets

FIG.1

WEATHER FORECAST p1 — 1st (MON.)
- Weather — Cloudy
- Probability of Precipitation — 10%
- Lowest Temperature — 3° C
- Highest Temperature — 12° C — x1 p2 — 2nd (TUES.)
- Weather — Cloudy
- Probability of Precipitation — 40%
- Lowest Temperature — 5° C
- Highest Temperature — 13° C — x2 p3 — 3rd (WED.)
- Weather — Cloudy, some rain
- Probability of Precipitation — 70%
- Lowest Temperature — 6° C
- Highest Temperature — 16° C — x3

WEATHER FORECAST

1st (MON.)
| | |
|---|---|
| Weather | PartlyCloudy |
| Probability of Precipitation | 10% |
| Lowest Temperature | 3° C |
| Highest Temperature | 12° C |

— x11

2nd (TUES.)
| | |
|---|---|
| Weather | Cloudy |
| Probability of Precipitation | 20% |
| Lowest Temperature | 5° C |
| Highest Temperature | 13° C |

— x12

3rd (WED.)
| | |
|---|---|
| Weather | Cloudy, some rain |
| Probability of Precipitation | 70% |
| Lowest Temperature | 8° C |
| Highest Temperature | 16° C |

2nd (TUES.)
Weather                          Cloudy
Probability of Precipitation     20%
Lowest Temperature               5° C
Highest Temperature              13° C 3rd (WED.)
Weather                          Cloudy, some rain
Probability of Precipitation     70%
Lowest Temperature               8° C
Highest Temperature              16° C

FIG. 5

```
< table >
< tr > <th> 1st (Mon.)              </ th> </ tr >
< tr > <th> Weather                 </ th> < td > Partly Cloudy </ td > </ tr >
< tr > <th> Probability of Precipitation</ th> < td > 10% </ td > </ tr >
< tr > <th> Lowest Temperature      </ th> < td > 3°C </ td > </ tr >
< tr > <th> Highest Temperature     </ th> < td > 12°C </ td > </ tr >
</ table >

< table >
< tr > <th> 2nd (Tues.)             </ th> </ tr >
< tr > <th> Weather                 </ th> < td > Cloudy </ td > </ tr >
< tr > <th> Probability of Precipitation</ th> < td > 20% </ td > </ tr >
< tr > <th> Lowest Temperature      </ th> < td > 5°C </ td > </ tr >
< tr > <th> Highest Temperature     </ th> < td > 13°C </ td > </ tr >
</ table >

< table >
< tr > <th> 3rd (Wed.)              </ th> </ tr >
< tr > <th> Weather                 </ th> < td > Cloudy, some rain </ td > </ tr >
< tr > <th> Probability of Precipitation</ th> < td > 70% </ td > </ tr >
< tr > <th> Lowest Temperature      </ th> < td > 8°C </ td > </ tr >
< tr > <th> Highest Temperature     </ th> < td > 16°C </ td > </ tr >
</ table >
```

FIG. 6

WEATHER FORECAST

| 1st (MON.) | |
|---|---|
| Weather | Partly Cloudy |
| Probability of Precipitation | 10% |
| Lowest Temperature | 3° C |
| Highest Temperature | 12° C |

| 2nd (TUES.) | |
|---|---|
| Weather | Cloudy |
| Probability of Precipitation | 20% |
| Lowest Temperature | 5° C |
| Highest Temperature | 13° C |

| 3rd (WED.) | |
|---|---|
| Weather | Cloudy, some rain |
| Probability of Precipitation | 70% |
| Lowest Temperature | 8° C |
| Highest Temperature | 16° C |

The weather forecast is updated every six hours.

FIG. 7

9 < Probability of precipitation 40%
9 > Probability of precipitation 20%

15 < Lowest temperature 6°C
15 > Highest temperature 8°C

FIG. 8A PRIOR ART

Weather Forecast

1st (MON.)
Weather — Partly Cloudy
Probability of Precipitation — 10%
Lowest Temperature — 3° C
Highest Temperature — 12° C

2nd (TUES.)
Weather — Cloudy
Probability of Precipitation — 20%
Lowest Temperature — 5° C
Highest Temperature — 13° C

3rd (WED.)
Weather — Cloudy, some rain
Probability of Precipitation — 70%
Lowest Temperature — 8° C
Highest Temperature — 16° C

---

Weather Forecast

1st (MON.)
Weather — Partly Cloudy
Probability of Precipitation — 10%
Lowest Temperature — 3° C
Highest Temperature — 12° C

2nd (TUES.)
Weather — Cloudy
\* Probability of Precipitation — 40%
Lowest Temperature — 5° C
Highest Temperature — 13° C

3rd (WED.)
Weather — Cloudy, some rain
Probability of Precipitation — 70%
\* Lowest Temperature — 6° C
Highest Temperature — 16° C

FIG. 8B PRIOR ART

TEXT STRUCTURE ANALYSIS METHOD AND TEXT STRUCTURE ANALYSIS DEVICE

BACKGROUND OF THE INVENTION

1. Field of Invention

The present invention relates to a text structure analysis method and text structure analysis apparatus applied to analytical processing of text. More specifically, the present invention relates to an apparatus and method for taking differing parts of a plurality of texts and extracting a portion of the content of a given text.

2. Description of Related Art

In known methods of text analysis, when performing processing on two given documents by determining and extracting the differing portions of the given documents, it is common to process them by treating one line or one sentence as a unit and performing structural analysis based on their connections/relationships. For example, there is known a method of processing text by examining the connections/relationships of sentences and creating a tree or graph of the text based on these connections/relationships. Another known method of performing text analysis creates a paragraph having joined sentences from the connections/relationships of the sentences.

Japanese Laid-Open Patent Applications No. 4-23765 (JP 4-23765), No. 6-35960 (JP 6-35960), No. 7-200589 (JP 7-200589), and No. 8-6945 (JP 8-6945) disclose examples of the tree/graph method of text analysis. Japanese Laid-Open Patent Applications No. 4-306768 (JP 4-306768) and No. 5-324708 (JP 5-324708) disclose examples of the method employing paragraphs of joined sentences.

The method according to JP 4-23765 performs syntactic analysis regarding each of two texts and tries to detect differing parts in these texts using syntax trees.

In the apparatus according to JP 6-35960, a document structure detection unit that uses surface-level vocabulary and a document structure detection unit that uses grammatical subjects are utilized to perform text analysis. The apparatus performs detailed structural analysis of documents, not only by using vocabulary information appearing on the surface level of the sentences, but also by using grammatical subjects detected from each sentence, including subjects not clearly indicated in the sentences.

The method of JP 7-200589 extracts text having qualifying relationships between sentences in the form of a tree structure. The method arranges and displays a portion of text using the extracted tree structure.

The method of JP 8-6945 generates nodes based on rules governing the assembly of attributes of neighboring lines, connects the nodes with links, and applies costs to the nodes and links. The method interprets the logical structure of the sentences by traversing text graphs.

The method of JP 4-306768 joins and performs structural analysis of sentences based on connections/relationships between the sentences in the documents.

The method of JP 5-324708 restores paragraph information according to connections/relationships and segmentation rules for each sentence, and performs structural analysis by considering that paragraph information.

All of these known methods and apparatus perform processing that examines the connections/relationships of texts with a sentence or line as being the smallest unit treated. As a result, computational volume is great and large amounts of computational time are required for processing.

Additionally, all of these known methods and apparatus merely perform processing according to predefined rules (rules regarding connections/relationships) The user cannot change the method of analysis in accordance with a particular sentence being processed. Furthermore, after having performed some sort of processing using the results of structural analysis, when outputting the results, various problems arise, such as having to perform analysis again using the results of the structural analysis and having to reconstruct the text for output.

Also, when taking the differing part between two sentences or lines of text, processing in the known methods is performed so as to indicate the fact that a changed portion exists in that line by outputting only the line having the change or by outputting the entire text and assigning a mark to the start of the line having the change.

Figure 2:
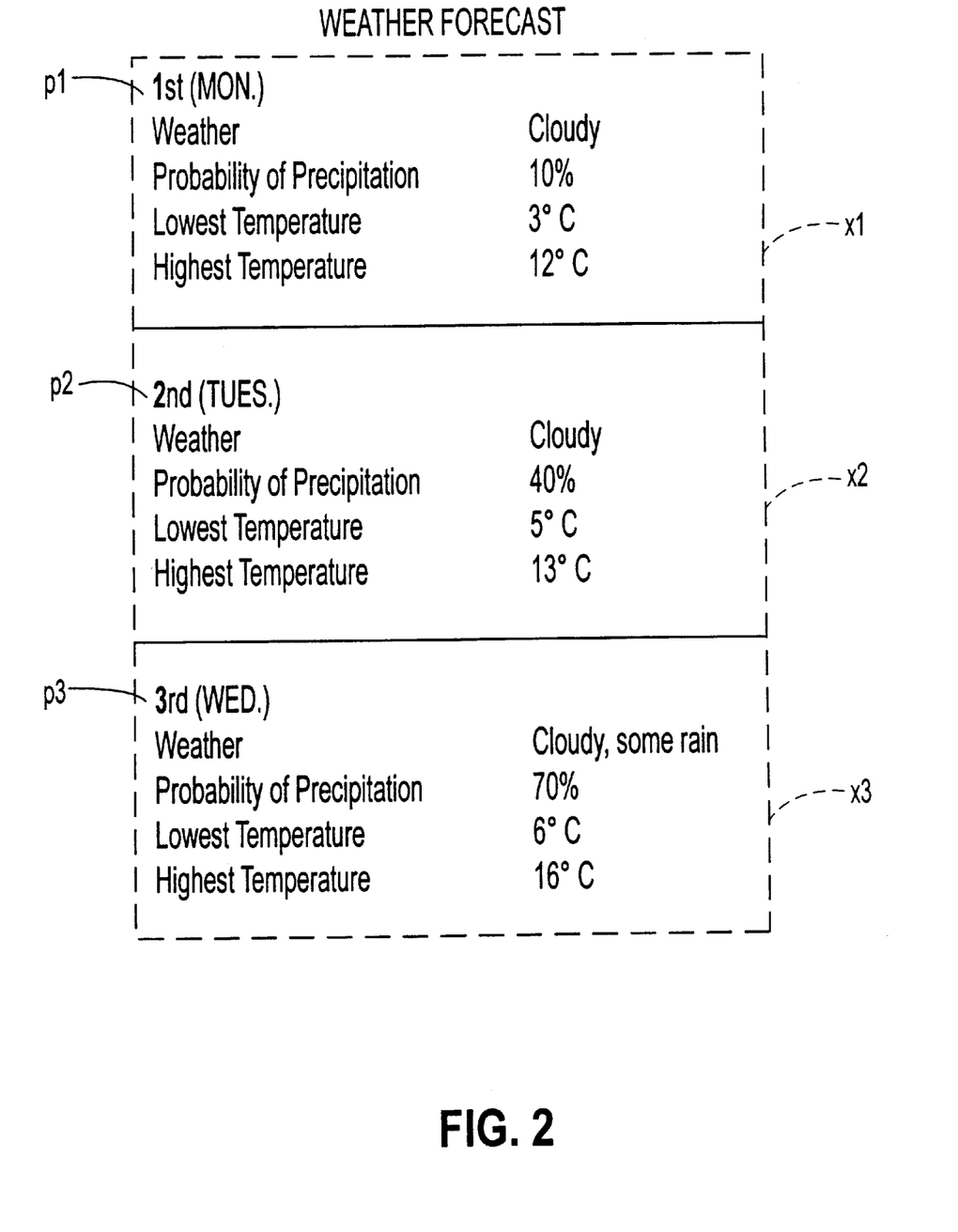
FIG. 2 is a drawing showing an example of unchanged object text.

For example, consider a portion of text representing a three-day weather forecast, such as shown in FIG. 2, having a change in a part of its content. For this example, the weather forecast is changed from that of FIG. 2 to the forecast shown in FIG. 4. Comparing the contents of FIG. 2 and FIG. 4, the probability of precipitation on the 2nd of the month was changed from 40% to 20% and the lowest temperature on the 3rd of the month was changed from 6° C. to 8° C.

Figure 8A:
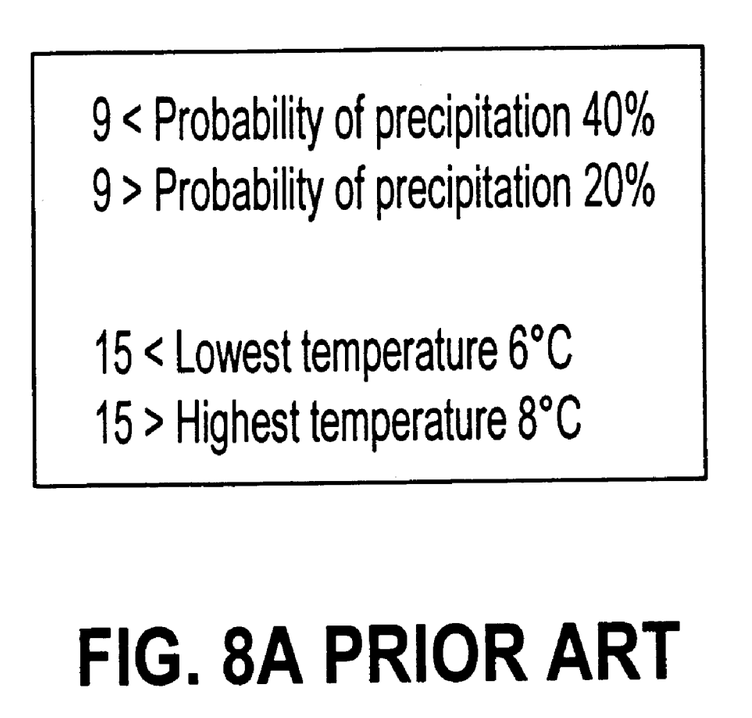
FIG. 8A is a drawing showing a prior art method in which only the different lines are displayed.
Figure 8B:
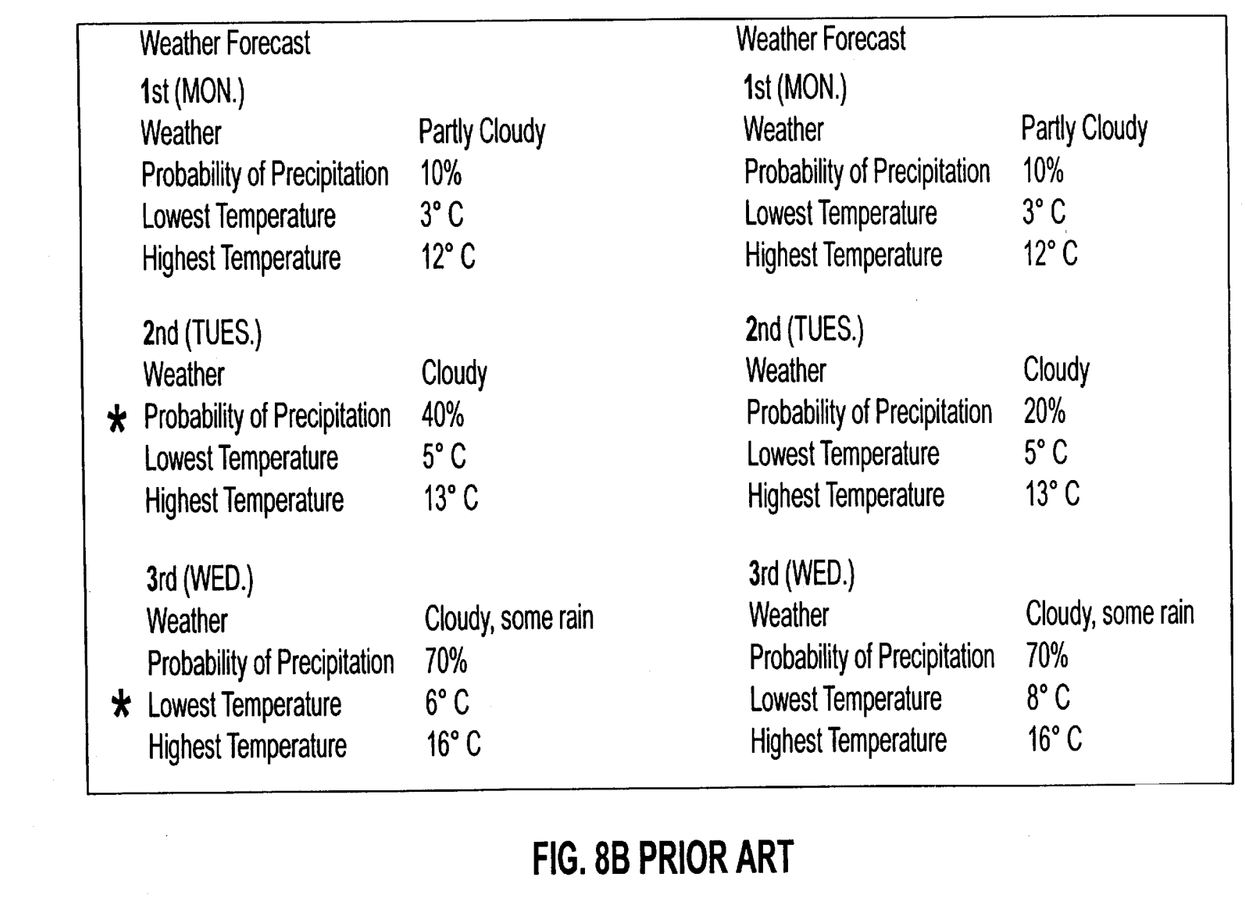
FIG. 8B is a drawing showing another prior art method where the full text is displayed and the different parts are marked.

In the known methods, when attempting to output the content of the differing parts of two portions of text or line units, only the changed part is displayed, as shown in FIG. 8A, or the entire text is displayed with a mark (for example, an asterisk) assigned to the line having the change, as shown in FIG. 8B.

Figure 4:
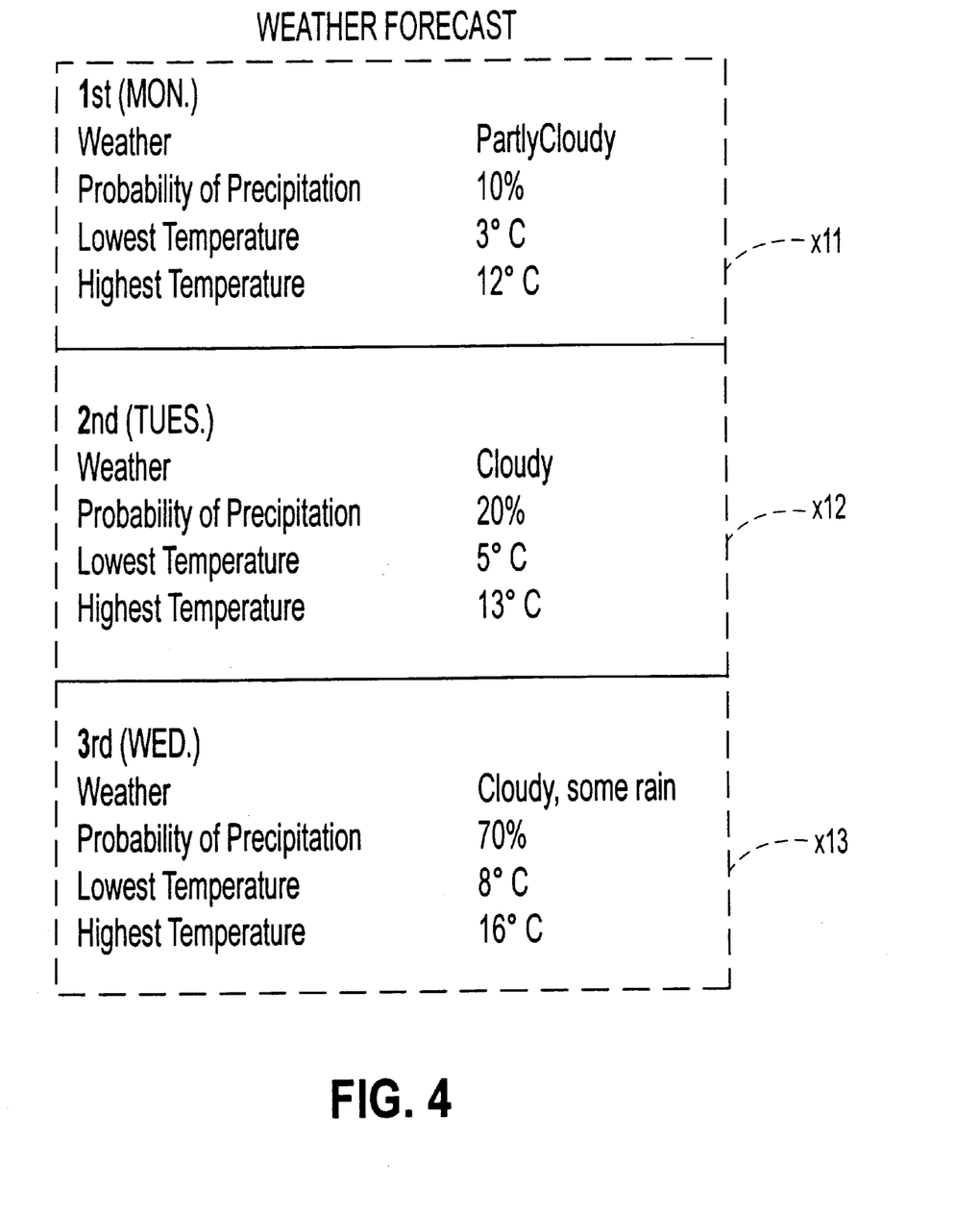
FIG. 4 is a drawing showing the object text of FIG. 2 after modification.

In the example shown in FIG. 8A, "9<" indicates the content of the 9th line before change, that is, the 9th line in FIG. 2 (Probability of Precipitation 40%) and "9>" indicates the content of the 9th line after change, that is, the 9th line in FIG. 4 (Probability of Precipitation 20%). In the same manner, "15<" indicates the content of the 15th line before change, that is, the 15th line in FIG. 2 (Lowest Temperature 6° C.) and "15>" indicates the content of the 15th line after change, that is, the 15th line in FIG. 4 (Lowest Temperature 8° C.).

In FIG. 8A, because only the line having the change is displayed, the surrounding context cannot be grasped. Similarly, in FIG. 8B, all of the text is displayed, but the context cannot be grasped because too much text is displayed.

SUMMARY OF THE INVENTION

Thus, the aim of the present invention is to provide a text structure analysis method and text structure analysis device capable of processing units or blocks of textual content. The processing is performed by extracting content for each collection of content of the text, for example, when taking the differing part of two texts and extracting a part of the textual content.

In a first aspect of the present invention, the text structure analysis method comprises detecting a content boundary pattern for each collection of textual content from an input text indicating a boundary of that collection, establishing a content boundary for the input text based on the result of that detection, and treating the input text in units or blocks of textual content for each collection of content based on the established content boundary. In another aspect of the present invention, the content boundary pattern is a lexical unit or code occurring repeatedly within the text. In a further aspect of the present invention, the content boundary pattern is a control code occurring repeatedly within the text when the input text is coded with a text coding language.

In another aspect of the invention, the content boundary pattern is a pattern respectively representing a starting point and an ending point of a given collection of content, and the content contained between these patterns is treated as one unit of textual content.

In a further aspect of the present invention, a text structure analysis device comprises a content boundary pattern storage means for storing a content boundary pattern for each collection of textual content from an input text indicating a boundary of that collection and a text analysis means for detecting a boundary section present in an input text based on the content stored in this content boundary pattern storage means. The text analysis means establishes a content boundary for the detected boundary section.

Thus, the present invention is capable of extracting portions of text in units or blocks of textual content based on established content boundaries. The invention performs this extraction by detecting a content boundary pattern indicating a boundary of a collection of textual content from an input text. As a result, processing based on a structural analysis from connections/relationships of the portions of text, and the like, becomes unnecessary and processing can be greatly simplified.

As stated, the lexical units and codes appearing repeatedly in the text may be established as content boundary patterns. These content boundary patterns can be indicated by the user in accordance with the text that is the object of the processing (hereinafter referred to as the object text). They can also be discovered automatically by the system. That is, by detecting the lexical units and codes appearing repeatedly in the input text, the system can store those detected lexical units and codes as content boundary patterns and can establish content boundaries in the input text based on those stored lexical units and codes. Accordingly, it becomes possible to establish the content boundaries in accordance with the object text.

As also stated, when the input text is coded in a text coding language, the control codes appearing repeatedly in the text may be established as content boundary patterns. In this case as well, the content boundary patterns can be indicated by the user in accordance with the object. They can also be discovered automatically by the system. That is, by detecting the control codes appearing repeatedly in the input text, the system can store those detected control codes as content boundary patterns, and can establish content boundaries in the input text based on those stored control codes. Accordingly, it becomes possible to establish the content boundaries in accordance with the object text.

By using a pattern representing the starting point and a pattern representing the ending point of the textual content of a given collection, the system can indicate both the starting point and the ending point of a given collection and can clearly mark the scope of text for extraction.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
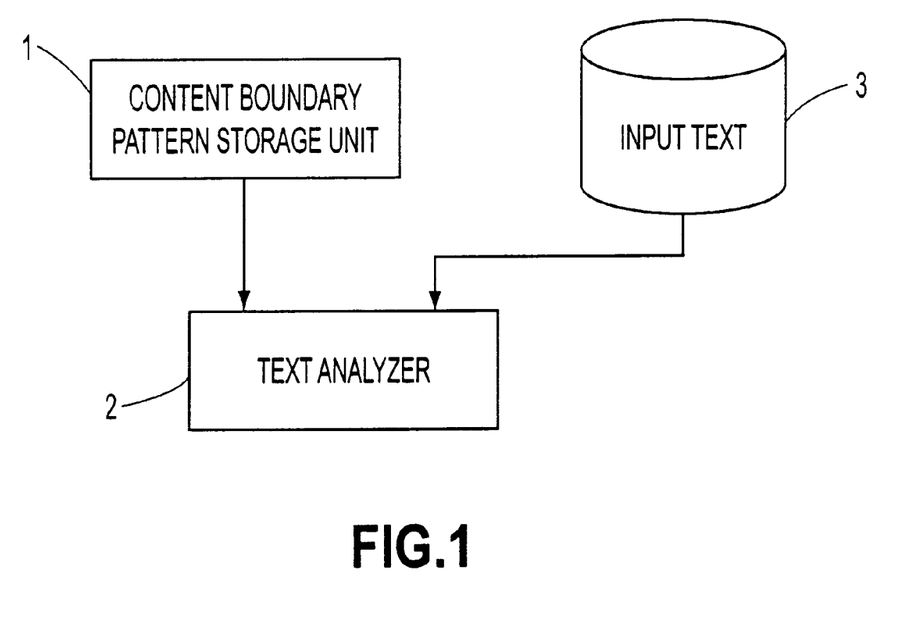
FIG. 1 is a block diagram showing the configuration of a preferred embodiment of the text structure analysis system according to the present invention.

FIG. 1 is a drawing showing the configuration of the text structure analysis apparatus of the present invention. The apparatus comprises a content boundary pattern storage unit 1, a text analyzer 2, and an input text 3.

Content boundary pattern storage unit 1 stores a pattern (patterns) representing a boundary of textual content representing one collection of textual content. This boundary will be explained with reference to an example of a weather forecast, as shown in FIG. 2. As shown in FIG. 2, information representing the date and day of the week is recorded as "1st (Mon.)" in the paragraph below the heading "Weather Forecast." In the paragraph below that, contents such as "Weather Partly Cloudy", "Probability of Precipitation 10%", "Lowest Temperature 3° C." and "Highest Temperature 12° C." are recorded as the contents of the weather forecast on that day. Information representing the date and day of the week recorded as "2nd (Tues.)" and the contents of the weather forecast on that day are recorded next, followed by information representing the date and day of the week recorded as "3rd (Wed.)" and the contents of the weather forecast on that day.

In such text, the parts enclosed in the frames indicated by the dashed lines in the drawing can be treated respectively as collections of content x1, x2, and x3.

Here, the lexical unit "number+number suffix" representing each day is used as a boundary pattern representing the boundary of each of these collections of content x1, x2, and x3. That is, the boundary pattern p1 in collection x1 is "1st", the boundary pattern p2 in collection x2 is "2nd", and the boundary pattern p3 in collection x3 is "3rd." In regard to such boundary patterns, as described previously, "number+number suffix" may be automatically extracted by the system from the text and may be established by the user as "number+number suffix". The boundary pattern "number+number suffix" established by the system or by the user is stored in the content boundary pattern storage unit 1 as a content boundary pattern.

When the object text is input, text analyzer 2 establishes content boundaries of the object text based on the content boundary patterns stored in content boundary pattern storage unit 1. The processing for establishing the content boundaries in regard to the input object text is explained with reference to FIG. 3.

Figure 3:
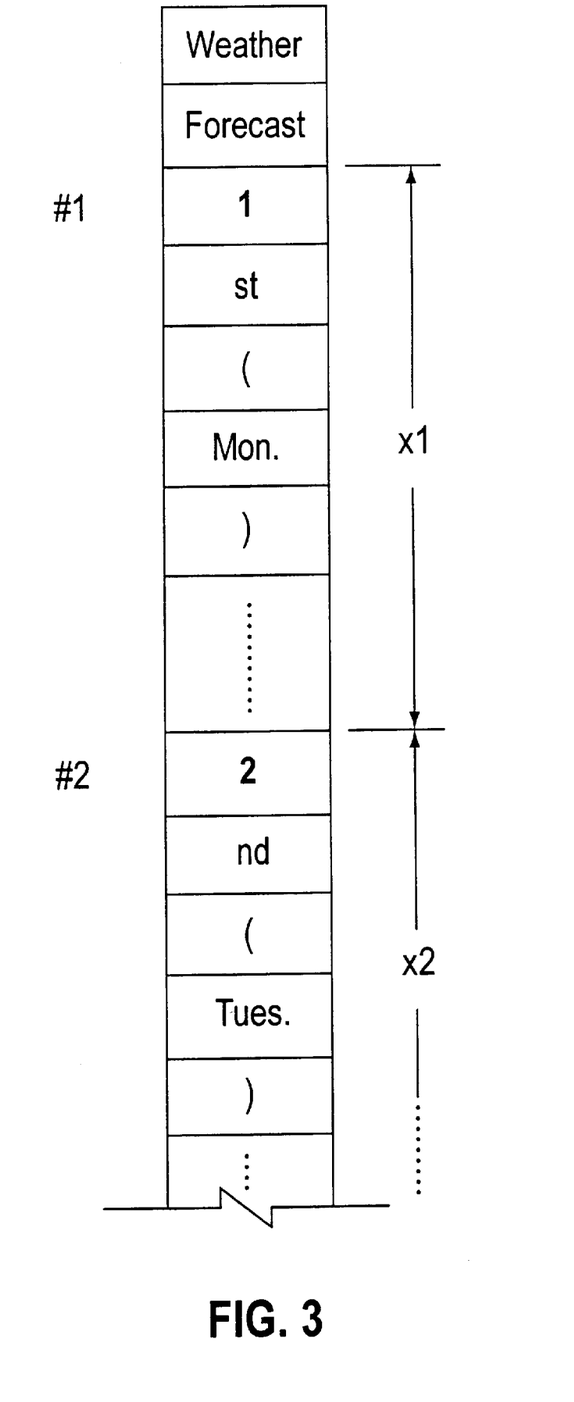
FIG. 3 is a drawing showing a data structure of the unchanged object text of FIG. 2 according to a preferred embodiment of the present invention.

FIG. 3 shows the data structure of the text of the weather forecast shown in FIG. 2. The boundary pattern stored in the content boundary pattern storage unit 1 is "number+number suffix". Accordingly, when a text, such as in FIG. 2, is input in text analyzer 2, the data structure of the input text (shown in FIG. 3) is checked from the start of the text. The part matching the boundary pattern stored in content boundary pattern storage unit 1 is detected and the content boundary is established from the start of the matching part.

In this example, the parts matching "number+number suffix" are "1st", "2nd", and "3rd." Boundaries #1, #2, and #3 are established, respectively referring to the starting points of these boundaries, namely, the numbers "1", "2", and "3". The addresses of "1", "2", and "3" are established, thus establishing the content boundaries of the object text.

Also, the text from the start of each content boundary to immediately before the next content boundary is defined as one unit of content. For example, the text from content boundary #1 to immediately before content boundary #2 is defined as collection x1, the text from content boundary #2 to immediately before content boundary #3 is defined as collection x2, and the text following content boundary #3 is defined as collection x3.

When the weather forecast shown in FIG. 2 is input into the text analyzer 2, the content boundary patterns of the input text established by the user or by the system are stored in the content boundary pattern storage unit 1. Accordingly, in the document analyzer 2, the content boundaries are established in regard to the input text based on the boundary patterns stored in the content boundary pattern storage unit 1, and the contents x1, x2, and x3 are extracted based on the first input text.

When the text of the weather forecast is changed (as shown in FIG. 4) and new information is input into the text analyzer 2, in the same manner as before, the content boundaries are established in regard to the input text based on the boundary patterns stored in the content boundary pattern storage unit 1. The collections x11, x12, and x13 are extracted, based on the second input text, as shown in FIG. 4.

By comparing the differing parts for each of the collections (x1 and x11, and x2 and x12, x3 and x13), the difference between the first and second input text can be determined and the corresponding collections containing the next textual content are displayed. In these examples, the probability of precipitation was changed from 40% to 20% within the contents of collection x2 and collection x12 and the lowest temperature was changed from 6° C. to 8° C. within the contents of collections x3 and x13.

Figure 5:
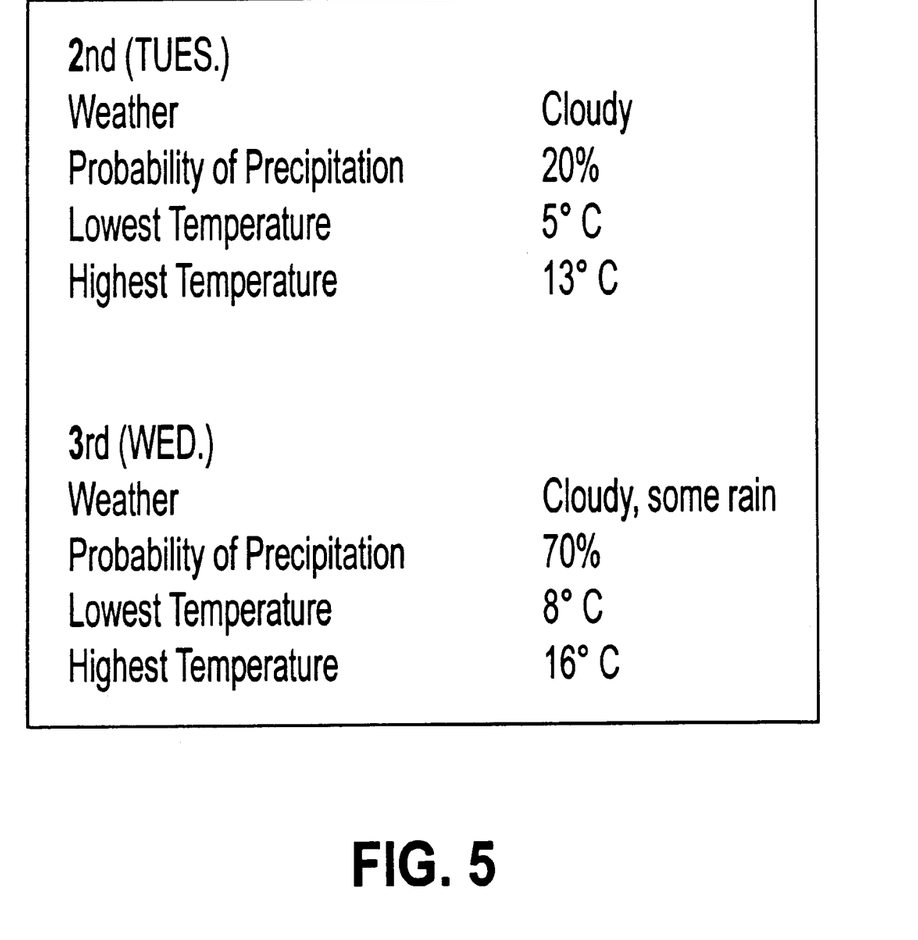
FIG. 5 is a drawing showing the result of processing the differing part of the portions of text shown in FIG. 2 and FIG. 4.

The results of the above processing are shown in FIG. 5. As is clear from FIG. 5, the results are displayed in units or blocks of textual content. Therefore, when compared with the prior art display of only the changed parts (shown in FIG. 8A), because the surrounding contents related to the differing parts are also shown, discrimination of the contents becomes easier for the viewer. Also, comparing the above method with the prior art method of displaying the fill text (shown in FIG. 8B), because the display is in units of textual content in this invention, the problem of having too much content displayed is avoided.

Additionally, by displaying the changed parts in a different color from the rest of the text (for instance "Probability of Precipitation 20%" on the 2nd and "Lowest Temperature 8° C." on the 3rd), it is easier for the viewer to visually recognize the changed parts.

Furthermore, when the input text is coded in a text coding language, the control codes may also be established as the content boundary patterns. For example, in HTML (Hyper Text Markup Language), "<table>", "</table>", "<tr>", "<th>", and the like, are used as control codes. For example, when the contents coded as shown in FIG. 6 are displayed, they are displayed as a table as shown in FIG. 7.

Here, "<table>" indicates the start of the first table, and "</table>" indicates the end of that table. Accordingly, by treating the text between the "<table>" and "</table>" codes as one group, they can also be established as one unit or block of textual content. In this case, "<table>" is used as the content boundary pattern indicating the start of the first unit or block of textual content and "</table>" is used as the content boundary pattern indicating the end of the first unit or block of textual content.

Figure 6:
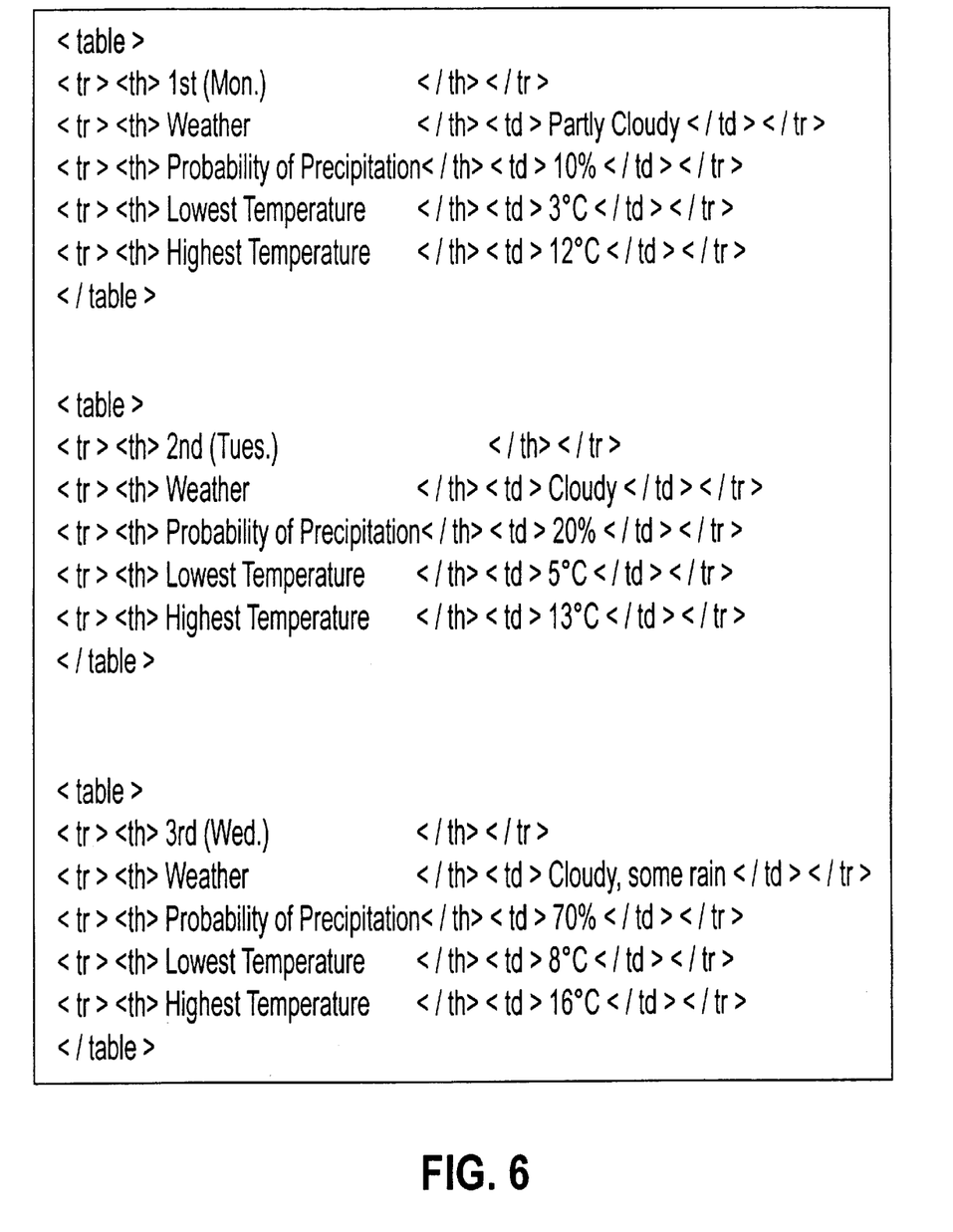
FIG. 6 is a drawing showing an example of textual content coded using HTML.
Figure 7:
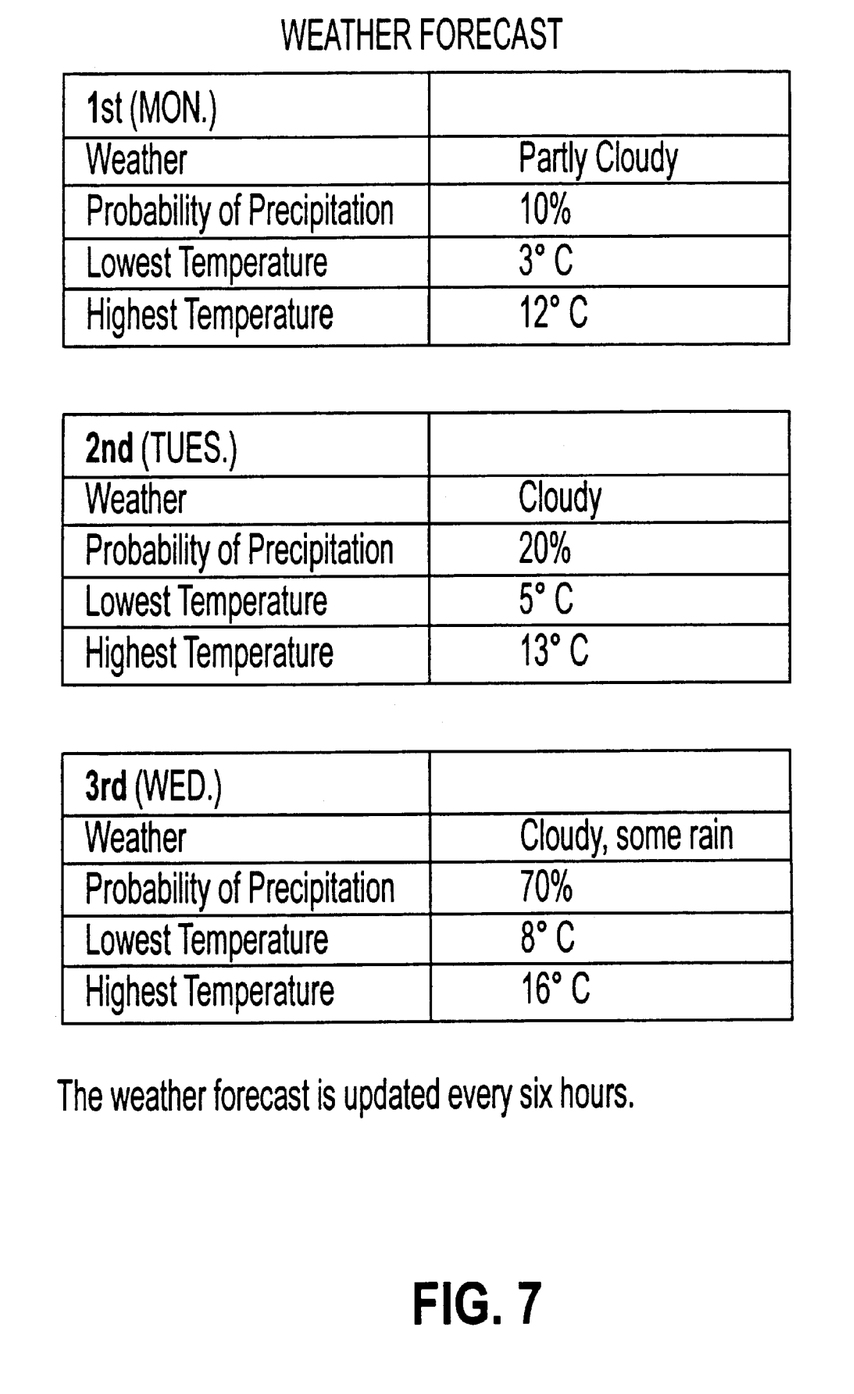
FIG. 7 is a drawing showing the text created using the text coding language in FIG. 6.

Because the start and end of a unit of textual content can be specified by treating control codes as content boundary patterns, information not directly related to the content, such as "The weather forecast is updated every 6 hours" as shown in FIG. 6, can be excluded when extracting the textual content as a unit or block of content. Accordingly, the unit of content can be limited to only that which is necessary.

Even when the content of one text is, for example, text crossing two lines, and the content of the other text itself is not changed, but crosses three lines, having a line break and a space, accurate processing and comparison of the two texts can be accomplished with the present invention. This is done by extracting the entirety of the texts as one unit or block of content and comparing the texts without treating the line breaks and spaces as differences. In short, in regard to that which does not pertain to the content of the text itself and is changed only in form and has no significance, because those can be ignored, the differing parts of the text itself can be taken.

Additionally, because there is no need to examine the connections/relationships of the units of text, the computational volume can be greatly reduced and the processing can be made far easier. That is, because the contents can be extracted by only checking the input text according to the content boundary patterns stored in the content boundary storage unit 1, there is no need to perform structural analysis while considering connections/relationships as in the prior art, and therefore, the processing can be made easier. Furthermore, in the present invention, because the contents can be output as they are, the processing volume can be greatly reduced.

Also, content boundary patterns, for example, patterns of lexical units such as "number+number suffix" or control codes of text coding languages such as "<table>" and "</table>" can be established by the user as content boundary patterns. However, when these patterns of lexical units or control codes appear repeatedly at fixed intervals within the text, it also becomes possible to extract the contents automatically on the system side by automatically detecting these patterns. Thus, because it becomes possible to establish the boundary patterns in accordance with the input text, it becomes possible to extract the matching contents in the text.

The embodiment explained above is an example of a preferred embodiment of the present invention. However, the invention is not limited to this and various modified embodiments are possible within a range not deviating from the main principle of the present invention. For example, in the embodiment described previously, "number+number suffix" was used as a content boundary pattern, but the invention is not limited to this particular embodiment and any possible identifiers of content boundaries are acceptable if they can be used to detect a collection of textual content.

Furthermore, a processing program for performing the processing of the present invention can be stored on a storage medium such as a floppy disk, optical disk, hard disk, and the like. Additionally, it can also be in a format obtainable via a network.

What is claimed is:

1. A text structure analysis method, comprising the steps of:

detecting a content boundary pattern for each collection of content from an input text, the detected content boundary pattern indicating a boundary of the collection;

establishing a content boundary for the input text based on the detected content boundary pattern; and     processing the input text in units of content for each collection of content based on the established content boundary;

wherein detecting the content boundary pattern includes detecting a control code occurring repeatedly within the input text when the input text is coded with a text coding language.

2. The text structure analysis method of claim 1, wherein detecting the content boundary pattern includes detecting lexical unit(s) and/or code(s) occurring repeatedly within the input text.

3. The text structure analysis method of claim 1, wherein detecting the content boundary pattern includes detecting a set of patterns respectively representing a starting point and ending point of a given collection of content, and wherein processing includes processing the content contained between each of these patterns as one unit of content.

4. The text structure analysis method of claim 1, wherein the input text and the content boundary are respectively the first input text and the first content boundary, further comprising the steps of:

detecting the content boundary pattern for each second collection of content from a second input text, the detected content boundary pattern indicating a boundary of the second collection;

establishing a second content boundary for the second input text based on the detected content boundary;

processing the second input text in units of content for each second collection based on the established second content boundary;

comparing the first and second input texts to determine differences between the first and second input texts; and     extracting correlated units of content of the first and second input texts based on the comparison.

5. The text structure analysis method of claim 4, wherein extracting includes extracting correlated units of content which are different from each other in the first and second input texts.

6. The text structure analysis method of claim 4, further comprising displaying the extracted units of content.

7. The text structure analysis method of claim 4, further comprising displaying the extracted units of content together.

8. A text structure analysis device, comprising:

detecting means for detecting a content boundary pattern for each collection of content from an input text, the detected content boundary pattern indicating a boundary of the collection;

establishing means for establishing a content boundary for the input text based on the detected content boundary pattern; and     processing means for processing the input text in units of content for each collection based on the established content boundary;

wherein the content boundary pattern is a control code occurring repeatedly within the input text when the first input text is coded with a text coding language.

9. The text structure analysis device of claim 8, further comprising storage means for storing input text to be processed.

10. The text structure analysis device of claim 8, further comprising storage means for storing the content boundary pattern(s).

11. The text structure analysis device of claim 8, wherein the content boundary pattern(s) are lexical unit(s) and/or code(s) occurring repeatedly within the input text.

12. The text structure analysis device of claim 8, wherein the content boundary pattern is a set of patterns representing a starting point and an ending point of a given section, and wherein the content contained between the set of patterns is treated as one unit of content.

13. The text structure analysis device of claim 8, wherein the input text and the content boundary are respectively the first input text and the first content boundary, and wherein the detecting means detects a collection of a second input text having the content boundary pattern and establishing a second content boundary for the collection of the second input text based on the content boundary pattern and the processing means processes the first and second input texts in units based on the established content boundaries, further comprising comparing means for comparing correlated collections of the first and second input texts to determine differences between the first and second input texts and extracting means for extracting units of the first and second input texts based on the comparison.

14. The text structure analysis device of claim 13, wherein the extracting means extracts correlated units which are different from each other in the first and second input texts.

15. The text structure analysis device of claim 13, further comprising a display means for displaying the extracted units.

16. A text structure analysis apparatus, comprising:

a text storage that stores input texts to be processed;

a content boundary pattern storage that stores a content boundary pattern: and     a text analyzer that detects a collection of an input text input from the text storage having the content boundary pattern and establishes a content boundary for the collection based on the content boundary pattern;

wherein the content boundary pattern is a control code occurring repeatedly within the input text when the text is coded with a text coding language.

17. The text structure analysis apparatus of claim 16, wherein the content boundary pattern is a lexical unit or code occurring repeatedly within the input text.

18. The text structure analysis apparatus of claim 16, wherein the content boundary pattern is a set of patterns representing a starting point and an ending point of a collection of input text between the set of patterns.

19. The text structure analysis apparatus of claim 16, wherein the input text and the content boundary are respectively the first input text and the first content boundary, and wherein the text analyzer detects a second collection of a second input text input from the text storage having the content boundary pattern and establishes a content boundary for the second collection of the second text in accordance with the content boundary pattern, processes the first and second input texts in accordance with the established first content boundary and second content boundary, compares correlated collections of the first and second texts to determine differences between the first and second texts, and extracts sections of the first and second texts in accordance with the comparison.

20. The text structure analysis apparatus of claim 19, wherein the text analyzer extracts correlated sections which are different from each other in the first and second input texts.

21. The text structure analysis apparatus of claim 19, further comprising a display on which the extracted sections are displayed.

* * * * *